United States Patent [19]

Sanabria

[11] Patent Number: 4,459,094

[45] Date of Patent: Jul. 10, 1984

[54] PLODDER OUTLET ASSEMBLY

[75] Inventor: Jose A. Sanabria, Guatemala City, Guatemala

[73] Assignee: Colgate-Palmolive Company, New York, N.Y.

[21] Appl. No.: 425,207

[22] Filed: Sep. 30, 1982

[51] Int. Cl.[3] .......... B29F 3/12

[52] U.S. Cl. .......... 425/462; 252/134; 252/367; 252/370; 264/75; 264/245; 425/131.1; 425/191

[58] Field of Search .......... 425/462, 131.1, 191, 425/133.1, 192 R; 264/75, 245; 252/367, 370, 134

[56] References Cited

U.S. PATENT DOCUMENTS

| | | | |
|---|---|---|---|
| 2,296,842 | 9/1942 | Garvey et al. | 425/131.1 |
| 3,213,808 | 10/1965 | Schafer | 425/131.1 |
| 3,228,356 | 1/1966 | Schafer | 425/462 |
| 3,241,503 | 3/1966 | Schafer | 425/462 |
| 3,268,970 | 8/1966 | Kelly et al. | 425/131.1 |
| 3,392,685 | 7/1968 | Briggs | 425/131.1 |
| 3,767,338 | 10/1973 | Soderlund et al. | 425/462 |
| 3,779,676 | 12/1973 | Bernard | 425/192 R |
| 3,823,215 | 7/1974 | D'Arcangeli | 264/75 |
| 3,884,605 | 5/1970 | Grelon | 425/131.1 |
| 4,201,743 | 5/1980 | Perla et al. | 264/148 |

FOREIGN PATENT DOCUMENTS

| | | | |
|---|---|---|---|
| 47-3618 | 2/1972 | Japan | 252/134 |
| 57-70200 | 4/1982 | Japan | 264/75 |
| 371680 | 4/1932 | United Kingdom | 425/380 |

*Primary Examiner*—Jeffery R. Thurlow

*Attorney, Agent, or Firm*—Herbert S. Sylvester; Murray M. Grill; John A. Stemwedel

[57] ABSTRACT

A plodder outlet assembly for producing a bicolored detergent bar comprising a first plodder outlet for delivering a first mass of detergent material to a compaction chamber. Four pipes are provided for delivering a second detergent material to the compaction chamber. These pipes extend into the compaction chamber and abut the inner walls thereof leaving a cruciform space for the first detergent material. The compaction chamber is slightly conical in configuration for compaction purposes and so that material flowing beyond the ends of the pipes will envelope the second detergent material.

7 Claims, 3 Drawing Figures

PLODDER OUTLET ASSEMBLY

BACKGROUND OF THE INVENTION

1. Field of the Invention

This invention relates to apparatus for manufacturing detergent bars and, more particularly, to a plodder nozzle assembly for producing a bicolored detergent bar.

2. Description of the Prior Art

In the past, bicolored soap and detergent bars have been produced. One procedure for producing a multi-colored bar was to provide inserts and mold the bar about the inserts. Another procedure was to partially mix colored soap chips in a mass of soaps of a different color so a variegated bar would be produced. U.S. Pat. No. 3,884,605 discloses a device for producing striped soap bars. U.S. Pat. No. 4,201,743 discloses a method of making soap bars wherein indicia are formed by forcing soap material through dies into another mass of soap material. U.S. Pat. No. 2,296,842 discloses indicia provided in a soap bar.

Numerous problems have beset the manufacture of bicolored soap bars generally caused by minimal pressure at the nozzle orifice. This usually leads to a variety of troubles, including hazy or foggy inserts, distortion of one material by the other, irregular internal shapes being formed and a slow rate of production.

SUMMARY OF THE INVENTION

The present invention has for its object to produce a bicolored soap or detergent bar wherein the problems of the prior art are overcome.

In carrying out the invention, a plodder outlet assembly is used in connection with plodders delivering two different soap or detergent masses. A compaction chamber is provided into which a first material mass is delivered. Four equally spaced pipes extend into, but terminate short of, the end of the compaction chamber. The pipes abut against the inner walls of the compaction chamber so as to leave a cruciform-shaped space for the first mass. Since the second mass is delivered through the pipes spaced from the inner walls of the compaction chamber, due to the thickness of the pipes, further movement of the two different materials will cause the first material to envelope the material from the pipes with minimum or no distortion due to the minimum inwardly-extending pressure on the material from the pipes. The pipes and the compaction chamber are circular in cross section for equalization of focus and the compaction chamber is slightly tapered. The pipes terminate no more than one-third the length of the compaction chamber.

DETAILED DESCRIPTION OF THE INVENTION

Figure 1:
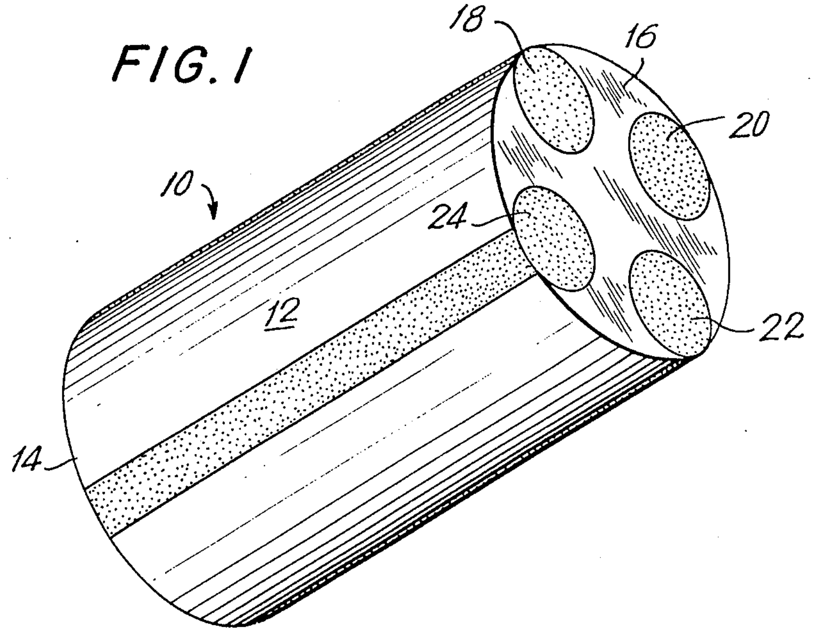
FIG. 1 is a perspective view of a detergent bar made in accordance with the concepts of the present invention.

Referring to FIG. 1, there is shown a bicolored detergent bar 10. The terms "detergent" and "soap" are to be considered interchangeable within the limits of this invention.

The detergent bar 10 has a cylindrical body 12 of substantially circular cross section and has ends 14 and 16. Embedded in the body 12 are four separate cylindrical bodies 18, 20, 22 and 24 of a different color from the body 12.

Figure 2:
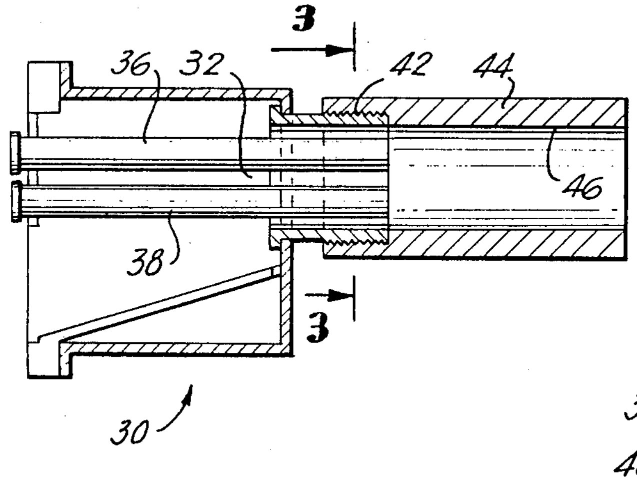
FIG. 2 is a longitudinal sectional view through the plodder outlet assembly.
Figure 3:
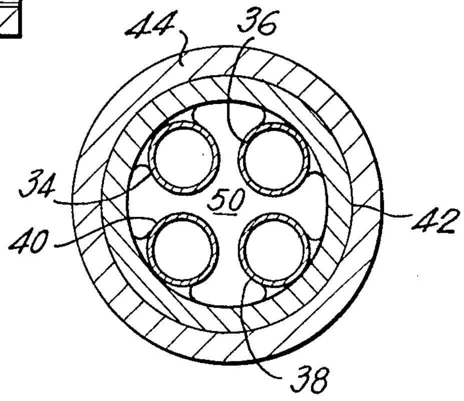
FIG. 3 is a vertical sectional view, taken along the plane of line 3—3, in FIG. 2.

Referring now to FIGS. 2 and 3, therein is disclosed a plodder outlet assembly 30. A plodder outlet 32 is connected to one barrel of a conventional two barrel Mazzoni plodder, the other barrel of the plodder being connected to four equally spaced pipes 34, 36, 38 and 40.

Threadedly detachably secured to the extruder outlet 32 at 42 is a compression chamber 44, the inner walls of which taper slightly as they project away from the plodder outlet 32, and thus is of a truncated conical configuration, though the taper is only very slight; i.e., on the order of about 5°.

The pipes 34, 36, 38 and 40 extend into the compaction chamber 44, but terminate within the first third of the length thereof.

An important feature of the present invention is that the pipes 34, 36, 38 and 40 abut against the inner walls 46, leaving a cruciform-shaped space 50, into which material from the outlet 32 and first extruder barrel is delivered.

Since the pipes 34, 36, 38 and 40 terminate in the first third of the length of the compaction chamber, the pressure on the first mass of material forces material into the space between the second material coming from the pipes to envelope the four cylindrically-spaced masses of the second material. This space between the second material masses and the inner walls is due to the thickness of the walls of the pipes 34, 36, 38 and 40. Due to the relief of stresses on the first mass of material because of the space to envelope the second mass of material, there is no perceptable cracking of the detergent bar while a firm bond between the material masses is achieved. Since the material masses are of different colors, the bicolored detergent bar 10 is achieved.

What is claimed is:

1. A plodder assembly for producing bicolored detergent bars comprising a plodder outlet for delivering a first material mass, four spaced pipes defining a substantially cruciform configuration therebetween for said first material mass for delivery of a separate continuous columnar mass of a second material, differently colored from said first material mass, and a compaction chamber having inner compression walls fitted over said plodder outlet, said pipes extending into said compaction chamber and abutting against said inner walls thereof.

2. A plodder outlet assembly according to claim 1, wherein said inner walls are slightly tapered away from said pipes.

3. A plodder outlet assembly according to claim 1, wherein said pipes are circular in cross section.

4. A plodder outlet assembly according to claim 1, wherein said pipes have ends terminating in said chamber, said chamber being circular in cross section, and tapering slightly inwardly as said chamber projects away from the ends of said pipes so that said first material mass spreads outwardly of said cruciform configuration to envelop said second material masses.

5. A plodder outlet assembly according to claim 4, wherein said pipes are circular in cross section.

6. A plodder outlet assembly according to claim 5, wherein said pipes terminate no more than one third the length of said compaction chamber.

7. A plodder outlet assembly according to claim 2, wherein the angle of taper is on the order of about 5°.

* * * * *